ID="MN"

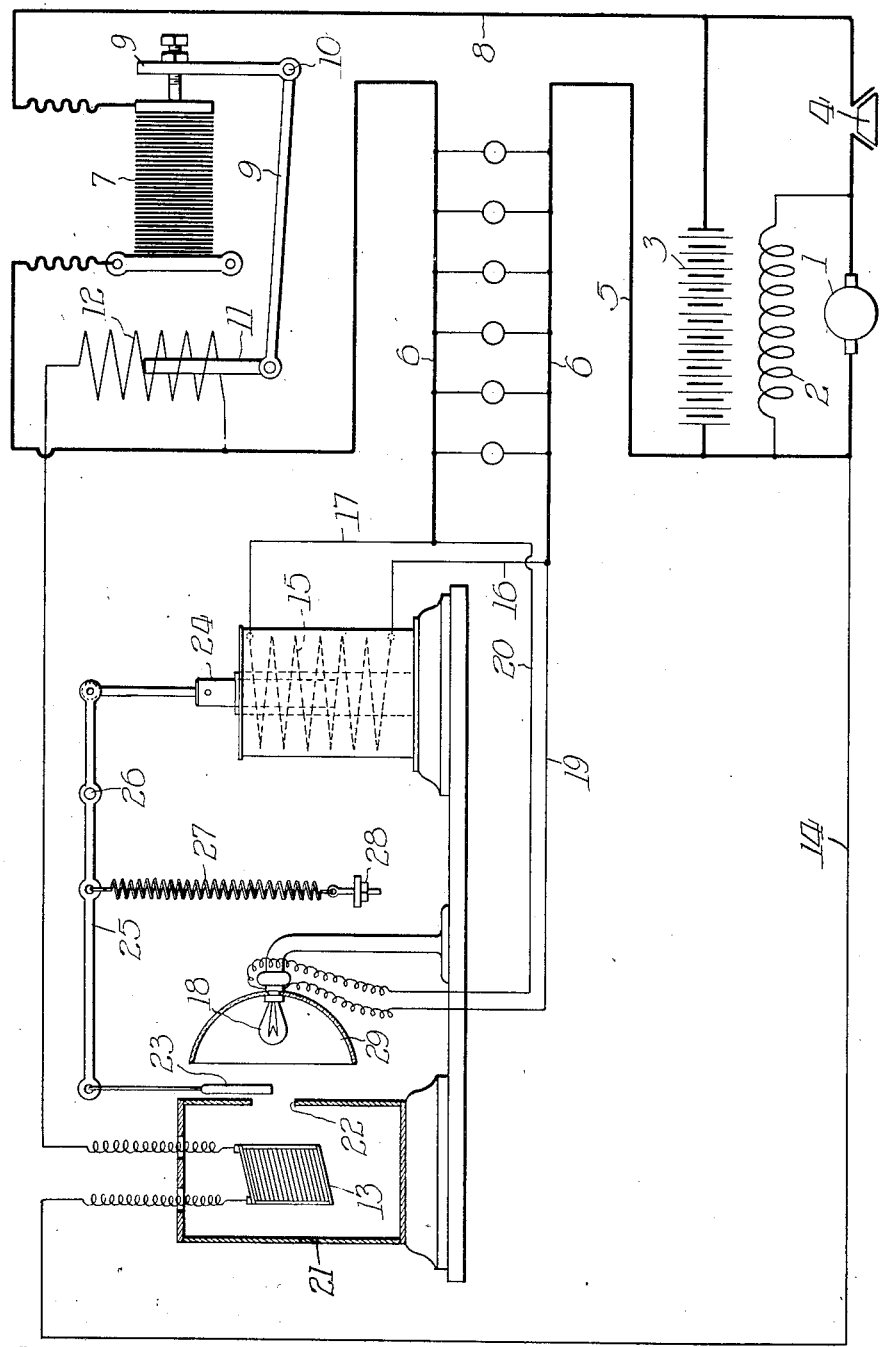

UNITED STATES PATENT OFFICE.

MORRIS MOSKOWITZ, OF NEW YORK, N. Y., ASSIGNOR, BY MESNE ASSIGNMENTS, TO CENTRAL TRUST COMPANY OF NEW YORK, A CORPORATION OF NEW YORK, TRUSTEE.

SELENIUM-CELL REGULATOR.

1,150,953.  Specification of Letters Patent.  Patented Aug. 24, 1915.

Application filed June 29, 1910. Serial No. 569,558.

*To all whom it may concern:*

Be it known that I, MORRIS MOSKOWITZ, a citizen of the United States, residing at New York city, in the county of New York and State of New York, have invented new and useful Improvements in Selenium-Cell Regulators, of which the following is a full, clear, concise, and exact description, reference being had to the accompanying drawing, forming a part of this specification.

My invention relates to electric regulators and particularly to that type in which there is employed a light responsive resistance unit such as a selenium cell or cells for coöperating with other instrumentalities to maintain constant voltage on a circuit.

My present invention is an improvement upon my copending application No. 567,612, filed the 18th day of June 1910, for "Selenium cell regulator", and has for its object to provide a regulator which shall require little or no attention or adjustment, and which shall have improved means for controlling the light which falls on the selenium cell or cells to vary its resistance.

In the accompanying drawings, I have selected for the purpose of illustration, a car lighting system having a shunt wound generator 1, with a field 2, and a storage battery 3, connected in circuit with said generator.

A switch 4 is illustrated which may be of any suitable type such as an automatic switch adapted to close the circuit from the generator to the battery under predetermined conditions.

The main circuit extends from the generator and storage battery through conductor 5, lamp circuit 6—6, resistance 7 and conductor 8, back to the battery and generator. When the generator is stationary or running at less than the predetermined speed, the lamp load is carried by the battery alone. When however, the generator speed rises above a certain point, the automatic switch 4 closes so that the generator may charge the battery and carry the lamp load. Inasmuch as the generator voltage must rise above the counter E. M. F. of the battery in order to charge the same, suitable means must be employed to prevent this excess voltage from being impressed on the lamp circuit. In the present instance I employ a carbon pile resistance 7, although I do not limit myself to this construction.

The pressure on the pile of carbon disks is varied by the bell crank lever 9 pivoted at 10, actuated by plunger 11 and controlled by solenoid 12, which solenoid is connected in a shunt circuit in which is also included the selenium cell or cells 13. This circuit may be traced from the generator through conductor 14, selenium cell or cells 13, and solenoid 12, back to the main circuit conductor 8.

Another solenoid 15 is connected across the lamp circuit 6—6, by means of conductors 16 and 17. A suitable light 18 is arranged adjacent to the selenium cell or cells. Any light may be employed, although I prefer to use an electric light connected across the lamp circuit by conductors 19 and 20. In the construction illustrated, there is shown an incandescent lamp adapted to burn below normal candle power, so that slight fluctuations in the voltage of the circuit will produce corresponding fluctuations in the light emitted. It should be observed that the regulating lamp 18 and the regulating solenoid 15 are both connected directly across the lamp circuit 6—6, so as to respond to all fluctuations in said circuit.

The selenium cell or cells 13 are preferably inclosed in a light tight receptacle 21, having an opening 22, the size of which may be varied by a slide or shutter 23, controlled by the regulating coil 15 coöperating with plunger 24, lever 25 fulcrumed at 26 and supporting at one end the slide 23 which is normally in its lowermost or closed position owing to the action of the spring 27 adjustably secured to a fixed support as at 28.

Of course I do not limit myself to the above details, as this particular arrangement for varying the size of the opening 22 is selected simply for the purpose of illustration. It is obvious that a number of suitable devices may be employed, for example, devices similar to those used as the diaphragms of cameras.

The lamp 18 is preferably provided with a reflector 29, or other light concentrating device and is conveniently mounted opposite the opening 22 of the receptacle 21 so as to direct the rays of light through the opening 22 upon the selenium cell or cells 13.

The operation of the regulator is as follows:—Upon a slight increase of the voltage of the lamp circuit, the regulating lamp 18 becomes brighter and thereby increases the amount of light passing through the opening 22, which at this time is becoming larger, as hereinafter described; which light, falling on the selenium cell or cells 13, decreases their resistance and consequently the resistance of the shunt circuit in which they are connected. Simultaneously the energization of coil 15 is increased, whereby the plunger 24 is drawn down against the action of spring 27, which is normally adjusted so as to maintain the slide 23 in its lowermost or closed position, thereby raising the slide 23 and increasing the effective size of the opening 22. The increase in the size of the opening 22 causes a still greater increase in the amount of light thrown on the selenium cell or cells and thereby augments the decrease of resistance caused by the increased light of the lamp.

It will be apparent that there are two factors responsive to fluctuations in the voltage of the lamp circuit, namely the solenoid and the incandescent light 18. Under certain conditions of adjustment, each of these instrumentalities will contribute largely to the variations in the light falling on the selenium cell or cells. Under other conditions of adjustment, the lamp 18 may be made to burn at normal candle power, or nearly so, whereby slight fluctuations in voltage will produce only very little or no corresponding variation in the amount of light emitted, the regulation depending almost entirely on the solenoid 15 which controls the size of the opening 22. In an extreme case, the light could be entirely independent of the circuit and would not even need to be an electric light. Under other conditions of adjustment, the lamp 18 may be made very sensitive and the solenoid 15 less responsive to fluctuations in voltage, so that the variations in the amount of light passing through the opening 22, will depend more on the fluctuations of the lamp 18 than on the variations in the size of the opening. It is further apparent that between these extremes, a variety of adjustments may be effected. In the present instance however, I desire to depend more on the variations in the size of the opening due to the solenoid, and less on the fluctuations of the lamp itself, although I do not limit myself to this adjustment.

Upon any tendency to an abnormal decrease in the voltage of the lamp circuit, it is apparent that the reverse of the above general operations will take place, the decreasing light emitted by the lamp and the diminishing of the size of the opening 22, or its complete closure, will increase the resistance of the selenium cell or cells to restore normal conditions.

The increase or decrease in the resistance of the shunt circuit, including the selenium cell or cells, will vary the amount of current passing through the solenoid 12 and consequently will regulate the pressure on the carbon pile 7 to increase or decrease the voltage of the lamp circuit, thereby tending to maintain normal conditions.

Although the above invention has been described in connection with a voltage regulator for a lighting circuit, it is obvious that the same elements could be used as a current regulator in connection with any desired circuit, and furthermore, the invention is clearly capable of general use wherever regulation is desired depending on a change in the conditions of the circuit being regulated. It will be further apparent that in this particular system illustrated, any suitable generator regulating means may be employed.

Having described my invention, what I claim as new and desire to secure by Letters Patent of the United States, is—

1. A regulator comprising a series of carbon disks normally under pressure, a solenoid for regulating the pressure on said disks, a selenium cell or cells for controlling said solenoid, an opaque receptacle for said cell or cells having an opening therein, a light for varying the resistance of said selenium cell or cells, and means for varying the size of said opening.

2. A lighting system comprising a circuit, a source of electrical energy for supplying said circuit, a plurality of parallel branches in said circuit, a variable resistance between said source and said branches, one of said branches including a light responsive resistance element, mechanical means for varying the amount of light on said light responsive resistance, and means also in said branch, controlled by said light responsive element for regulating said variable resistance.

3. A lighting circuit comprising a main circuit, a regulating resistance therein, electro-magnetic controlling means therefor, and means for controlling said electro-magnetic controlling means, comprising a light responsive resistance in circuit therewith, a source of light therefor, and means controlled by the voltage of the main circuit for increasing or decreasing the amount of light supplied to said light responsive resistance.

4. In a regulating device, a variable resistance, a solenoid controlling said resistance, a light responsive resistance in circuit with said solenoid, a source of light therefor, and mechanical means between said light responsive resistance and said source of light adapted to variably control the amount of light supplied to said resistance, thereby controlling the variable resistance.

5. A lighting system comprising a light responsive resistance, means coöperating therewith to control said lighting system proportionately to the value of said resistance, and means to control said resistance, comprising a source of light, and mechanical means between said source and said resistance to vary through a wide range the amount of light permitted to reach said resistance, said source of light varying in accordance with the variations in the lighting system under regulation.

6. In a lighting system, a lighting circuit, a solenoid connected across said circuit, a source of light and a shutter controlled by said solenoid and adjustably controlling the light from said source, and means for regulating said circuit in response to the amount of light admitted by said shutter.

In witness whereof, I have hereunto subscribed my name in the presence of two witnesses.

MORRIS MOSKOWITZ.

Witnesses:
 JOHN WILLETT,
 RAY G. LONDON.